United States Patent [19]

Johnson

[11] Patent Number: 5,690,368
[45] Date of Patent: Nov. 25, 1997

[54] ULTRASEAL SUMP ADAPTORS MODELS 54 AND 541

[76] Inventor: Arthur L. Johnson, P.O. Box 397, Warwick, N.Y. 10990

[21] Appl. No.: 453,162

[22] Filed: Sep. 25, 1995

[51] Int. Cl.$^6$ ............................................. F16L 3/04
[52] U.S. Cl. .................. 285/158; 285/205; 285/286; 285/416
[58] Field of Search ...................... 285/416, 192, 285/205, 363, 286, 159, 158; 220/661, 601, 561, 465

[56] References Cited

U.S. PATENT DOCUMENTS

| | | | |
|---|---|---|---|
| 506,842 | 10/1893 | Burke | 285/158 |
| 2,594,599 | 4/1952 | Uhri | 285/192 X |
| 2,647,769 | 8/1953 | Smith | 285/286 X |
| 2,653,834 | 9/1953 | Purkhiser | 285/363 X |
| 2,757,025 | 7/1956 | Noyes et al. | 285/205 X |
| 3,418,009 | 12/1968 | Pollia | 285/416 X |
| 4,492,392 | 1/1985 | Woods et al. | 285/192 X |
| 4,593,714 | 6/1986 | Madden | 285/205 X |
| 5,135,133 | 8/1992 | Frost | 220/601 |
| 5,366,318 | 11/1994 | Brancher | 285/192 X |
| 5,481,790 | 1/1996 | Koreis et al. | 220/661 X |

FOREIGN PATENT DOCUMENTS 823142  11/1951  Germany ................. 285/416

*Primary Examiner*—Dave W. Arola
*Attorney, Agent, or Firm*—Diller, Ramik & Wight, PC

[57] ABSTRACT

A sump adaptor is provided which includes first and second flanges having respective first and second openings, each having a respective first and second axis which axes are in coaxial relationship to each other when the flanges are assembled. A plurality of apertures are formed in a first of the flange and a plurality of threaded bolts which are welded to the second flanges pass through holes in annular seals which sandwich therebetween a bottom wall of a tank sump. The threaded bolts pass through the apertures of the second flange and nuts threaded to the threaded bolts coupled the flanges together. The first flange opening is unthreaded and receives a tubular portion having an exterior thread. A weld secures the tubular portion to the first flange. The opening of the second flange has interior threads into which are threaded exterior threads for releasably securing thereto a sump-associated element.

18 Claims, 2 Drawing Sheets

ULTRASEAL SUMP ADAPTORS MODELS 54 AND 541

BACKGROUND OF THE INVENTION

Liquid petroleum products and liquid chemical products are commonly stored in underground storage tanks which range in size from 300 gallons to over 5000 gallons. These tanks are of either single or double walled construction. These tanks have threaded openings on top to which supply and return piping or submersible pumps are installed. The use of nonmetallic tank sumps has become common when connecting piping and/or submersible pumps to the tanks. These sumps provide access from grade to the piping connection or submersible pumps.

A liquid-tight connection between the tank sump and the underground tank is critical to ensure that hazardous liquids will not leak into the ground should a failure occur in the double walled piping and/or the submersible pump and liquids collected in the tank sump. Additionally, federal underground storage tank regulations have made the use of tank sumps a standard practice when installing new underground storage tanks or when retro fitting new double walled piping to existing underground tanks.

DESCRIPTION OF RELATED ART

The increased usage of tank sumps has resulted in a number of tank sump adaptors being developed, all of which are of similar design utilizing a 4" NPT (National Pipe Thread) male thread on the bottom which is threaded into the tank opening and a 4" NPT female thread on the top in which pipe fittings and/or the submersible pump are threaded. The 4" male thread and the 4" female thread are part of the same one-piece housing. The mechanism used to connect the tank sumps to these conventional tank sump adaptors are metal compression rings of various designs. All prior tank sump adaptors have a flat horizontal surface on which a gasket is placed, on which the "cut out" tank sump is placed, and on which the compression ring is placed and tightened thereby resulting in the tank sump bottom wall being "sandwiched" between the horizontal surface and the compression ring with the gasket defining the liquid seal.

During conventional installation, it is critical that the installer tighten piping or the submersible pump to a certain point (not always 100%) to permit acceptable angles of tank sump wall penetrations to permit proper alignment with piping passing through the tank sump walls which are usually vertical flat sides.

SUMMARY OF THE INVENTION

The tank sump adaptor of the present invention is unique and distinguishes from conventional adaptors by providing first and second flanges which are selectively step-wise circumferentially adjustable relative to each other to obtain proper alignment of the tank sump sides and piping passing therethrough. This is achieved by circumferentially welding a first end portion of a tube or nipple in internal telescopic relationship to an unthreaded opening of the first flange with an opposite second end portion of the tube or nipple carrying external threads. The latter threads are threaded into a threaded opening in a top wall of an underground storage tank. A plurality of threaded bolts project upwardly from the first flange and these bolts pass through associated holes in a first seal, holes in the bottom wall of a tank sump, holes in a second seal, and apertures in a second flange which includes an internally threaded opening into which is threaded, for example, a submersible pump riser or pipe which carries a submersible pump. The entire assembly of the submersible pump, the submersible pump riser and the second flange can be rotated clockwise or counterclockwise, as viewed from above, as a unit to position the apertures of the second flange selectively upon the threaded bolts after which appropriate washers, lock washers and nuts hold the tank sump adaptor in sealed relationship. The selectively circumferential rotation of the second flange thereby assures alignment with associated piping entering through the tank sump wall absent unthreading of such connections as the submersible pump riser from the second flange and/or the externally threaded tube or nipple from the thread or opening of the underground storage tank.

DESCRIPTION OF THE PREFERRED EMBODIMENT

Figure 1:
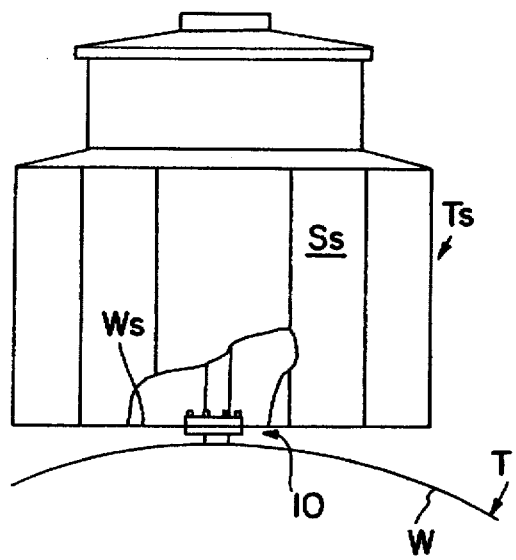
FIG. 1 is a highly diagrammatic view illustrating an installation which includes the present tank sump adaptor, and illustrates a tank sump connected to and supported by a tank sump adaptor of the invention which is in turn supported by an underground storage tank.
Figure 3:
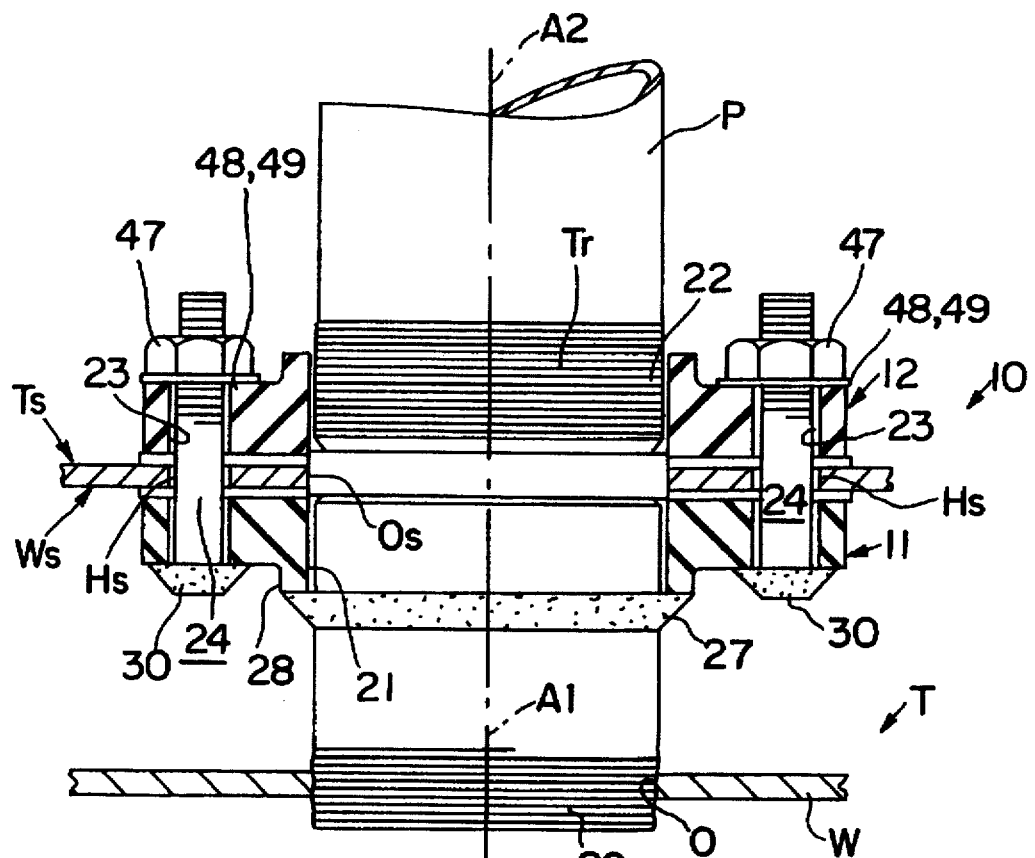
FIG. 3 is an enlarged cross-sectional view taken generally axially through the sump adaptor of FIG. 1, and illustrates the assembled relationship thereof with respect to the underground storage tank, the tank sump and a submersible pump riser.

A novel tank sump adaptor or sump adaptor constructed in accordance with this invention is generally designated by the reference numeral 10, and is illustrated in FIG. 1 associated with an underground storage tank T having a wall W which includes an internally threaded opening O (FIG. 3). The sump adaptor 10 supports a tank sump Ts which includes a bottom wall Ws and a opening Os (FIG. 3). A pipe P, such as a conventional submersible pump riser, carries a submersible pump (not shown), and the latter must be appropriately aligned with conventional piping (not shown) passing through a side wall Ss (FIG. 1) of the tank sump Ts.

Figure 2:
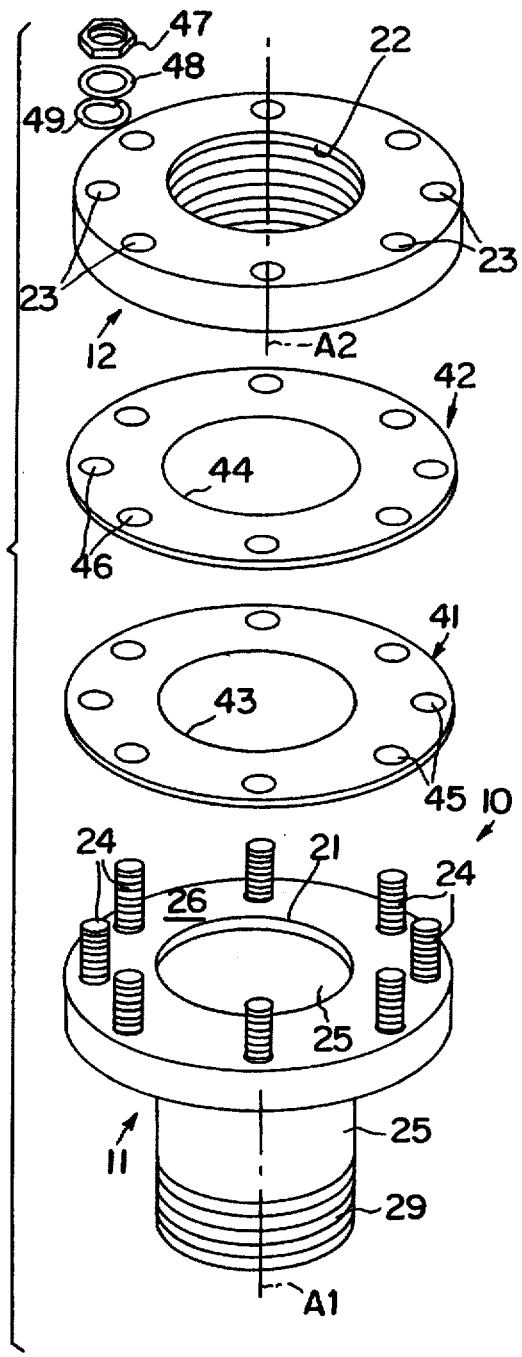
FIG. 2 is an exploded view of the tank sump adaptor of the present invention, and illustrates a first flange carrying an externally threaded nipple and a plurality of threaded bolts, a second flange having an internally threaded opening and a plurality of apertures, a pair of seals having holes matching the size and orientation of the apertures of the second flange and associated washers, lock washers and nuts for securing the sump adaptor in assembled relationship with respect to the tank sump and underground storage tank of FIG. 1.

Referring particularly to FIGS. 2 and 3 of the drawings, the sump adapter 10 of the present invention includes first and second flanges 11, 12, respectively, each having respective first and second openings 21, 22 and associated axes A1, A2 (FIG. 3) which are adapted to be in coaxial relationship to each other when the flanges 11, 12 are assembled (FIGS. 1 and 3). A plurality of apertures 23 are formed in one of the first and second flanges, and preferably and necessarily in keeping with the invention the apertures 23 are formed in the second flange 12. A plurality of connectors in the form of threaded bolts 24 are carried by another of the first and second flanges, specifically by the first flange 11. The plurality of connectors or bolts 24 are adapted for insertion into the plurality of apertures 23 and to the latter end the plurality of apertures 23 and the bolts 24 are spaced substantially equal circumferential distances d (FIG. 4) from each other. This allows the connectors or bolts 24 to be selectively inserted into the apertures 23 to selectively vary the relative circumferential position of the first and second flanges 11, 12, respectively, as will be more apparent hereinafter.

The interior surface (unnumbered) of the opening 21 of the first flange 11 is substantially cylindrical and unthreaded. A tube, pipe or nipple 25 includes a first end portion (unnumbered) which is inserted into the opening 21 to an extent substantially flush with an upper surface 26 of the first flange 11. Weld means 27 in the form of a circumferential exterior weld bead rigidly secures a flange neck 28 (FIG. 3) of the first flange 11 to the nipple or tubular portion 25 which at its lower end includes an exterior thread or thread means 29 which is threaded into the opening O (FIG. 3) of the wall W of the underground storage tank T during assembly, as will be described more fully hereinafter. The connectors or threaded bolts 24 pass through bores (unnumbered) of the first flange 11 and are rigidly secured thereto by welds 30 (FIG. 3).

Annular seals 41, 42 have respective openings 43, 44 and respective holes 45, 46 (FIG. 2) which are spaced circumferential distances from each other corresponding to the distances d (FIG. 4) between the apertures 23 and the connectors 24. The holes 45, 46 and the apertures 23 are alignable with each other and a like number of identically circumferential spaced holes Hs (FIG. 3) are formed in the bottom wall Ws of the tank sump Ts.

The submersible pump riser pipe P (FIG. 3) includes exterior threads Tr which are designed to be threaded into the threaded opening 22 of the second flange 12 (FIG. 3).

Figure 4:
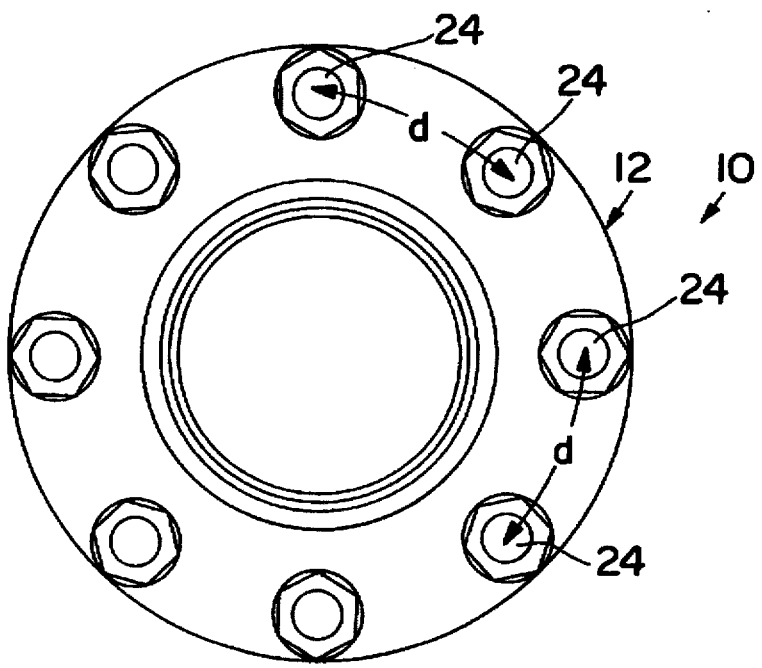
FIG. 4 is a top plan view of FIG. 3, and illustrates the substantially equal circumferential distances between adjacent threaded bolts, apertures and holes for effecting selective relative circumferential adjustment between the two flanges.

Connector means in the form of threaded nuts 47 and associated washers 48 and lock washers 49 hold the flanges 11, 12 in assembled relationship, as shown in FIGS. 3 and 4.

Assembly

At the site of the underground storage tank T, the first flange 11 (FIG. 2) is assembled to the wall W of the underground storage tank T by threading the threads 29 of the tubular portion 25 of the first flange 11 into the tank opening O (FIG. 3). As is best envisioned in FIGS. 1 and 2, this positions the axis A1 generally vertically, as are also disposed the individual connectors or bolts 24. The seal 41 is next seated upon the flat surface 26 of the first flange 11 by appropriately aligning the holes 45 with the connectors 24 and sliding the seal 41 downwardly. The tank sump Ts is next positioned with its holes Hs aligned with the connectors 24 and slipped down until the relationship illustrated in FIG. 3 is achieved. The seal 42 is next slipped over the connectors 24 via the holes 46 to the position shown in FIG. 3, namely, upon the internal surface (unnumbered) of the tank sump bottom wall Ws. At this point it is emphasized that the riser pipe P has been previously threaded by its threads Tr into the internal threads 22 of the second flange 12. Thus, the latter assembly is now slipped upon the connectors 24 in any one of eight different positions of relative circumferential adjustment, as established by the circumferential distances d designated in FIG. 4 which is an identical distance between the axes of all adjacent connectors 24, apertures 23 and the openings 45, 46. Thus, the entirety of the second flange 12 and any sump-associated element (such as the riser pipe P), preassembled and associated therewith, can be selectively positioned in any one of eight different positions to achieve the alignment heretofore described relative to associated piping passing into the tank sump Ts through the wall Ss after which the lock washers 49, washers 48 and nuts 47 are utilized to complete the assembly (FIG. 3).

From the foregoing, it is to be particularly noted that the tank sump installer can securely and completely tighten the threaded connections between the threads 29 and the opening O and the wall W of the underground storage T and between the threads 22 of the second flange 12 and the riser pipe P prior to positioning the tank sump T upon the first flange 11.

Furthermore, the sump installer need not loosen these threaded connections to complete the assembly or "back-off" on any threaded connection to properly line up submersible pump discharge ports (not shown), as is required in conventional installations. The direction of the pump discharge port associated with the submersible pump riser P can be adjusted by simply lifting the submersible pump, its riser P and the second flange 12 threaded thereto as a unit, rotate this unit to a desired position, lower the unit, and assemble the same as latter described.

Finally, the total installation as just described, and particularly the tightening of the nuts, can be completed by the sump installer without standing in the sump which otherwise might cause sump distortion and very often leads to nonliquid-tight sump seal (leakage).

We claim:

1. A sump adaptor comprising respective first and second flanges and first and second openings each having a respective first and second axis which axes are adapted to be in coaxial relationship to each other when the flanges are assembled, a plurality of apertures formed in one of said first and second flanges, a plurality of connectors carried by another of said first and second flanges, said plurality of connectors being adapted for insertion into said plurality of apertures, said plurality of apertures and said plurality of connectors being spaced substantially equal circumferential distances from each other whereby said connectors can be selectively inserted into said apertures to selectively vary the relative circumferential position of said first and second flanges, means for connecting said flanges together through said connectors, said first flange including a first tubular portion, said first tubular portion having exterior thread means for securing said first flange tubular portion to a tank, and said second flange second opening having internal thread means for releasably securing thereto a sump-associated element.

2. The sump adaptor as defined in claim 1 wherein said plurality of apertures are formed in said first flange, and said connectors are carried by said second flange.

3. The sump adaptor as defined in claim 2 including weld means for securing said first tubular portion to said first flange.

4. The sump adaptor as defined in claim 2 including weld means disposed circumferentially of said tubular portion for securing said first tubular portion to said first flange.

5. The sump adaptor as defined in claim 2 including weld means disposed circumferentially exteriorly of said tubular portion for securing said first tubular portion to said first flange.

6. The sump adaptor as defined in claim 2 including a pair of annular seals each having holes circumferentially spaced from each other a distance corresponding to the distance between adjacent apertures, and said annular seals being in sandwiched relationship between said flanges with each connector passing through an associated hole.

7. The sump adaptor as defined in claim 1 including weld means for securing said first tubular portion to said first flange.

8. The sump adaptor as defined in claim 1 including weld means disposed circumferentially of said tubular portion for securing said first tubular portion to said first flange.

9. The sump adaptor as defined in claim 1 including weld means disposed circumferentially exteriorly of said tubular portion for securing said first tubular portion to said first flange.

10. The sump adaptor as defined in claim 1 including weld means for securing each connector to said another of said first and second flanges.

11. The sump adaptor as defined in claim 1 wherein said connectors include threads, and said first connecting means are threaded nuts.

12. The sump adaptor as defined in claim 1 including a pair of annular seals each having holes circumferentially spaced from each other a distance corresponding to the distance between adjacent apertures, and said annular seals being in sandwiched relationship between said flanges with each connector passing through an associated hole.

13. The sump adaptor as defined in claim 1 including an underground tank having a threaded opening into which is threaded said first tubular portion exterior thread means.

14. The sump adaptor as defined in claim 13 wherein said axes are disposed vertically.

15. The sump adaptor as defined in claim 13 including a tank sump having a bottom wall including an opening and a plurality of holes, said tank sump bottom wall opening being in axial alignment with said axes, said connectors pass through said tank sump bottom wall holes, and said first and second flanges are disposed on opposite sides of said tank sump bottom wall.

16. The sump adaptor as defined in claim 15 wherein said axes are disposed vertically.

17. The sump adaptor as defined in claim 1 including a tank sump having a bottom wall including an opening and a plurality of holes, said tank sump bottom wall opening being in axial alignment with said axes, said connectors pass through said tank sump bottom wall holes, and said first and second flanges are disposed on opposite sides of said tank sump bottom wall.

18. The sump adaptor as defined in claim 17 wherein said axes are disposed vertically.

* * * * *